US010206252B2

(12) United States Patent
Galvano et al.

(10) Patent No.: US 10,206,252 B2
(45) Date of Patent: Feb. 12, 2019

(54) DRIVING SEVERAL LIGHT SOURCES

(71) Applicant: Infineon Technologies AG, Neubiberg (DE)

(72) Inventors: Maurizio Galvano, Padua (IT); Adolfo De Cicco, Castel d'Azzano (IT); Andrea Scenini, Montegrotto Terme (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/260,055

(22) Filed: Sep. 8, 2016

(65) Prior Publication Data

US 2018/0070417 A1 Mar. 8, 2018

(51) Int. Cl.
*H05B 33/08* (2006.01)
*H05B 37/02* (2006.01)
*G09G 3/20* (2006.01)

(52) U.S. Cl.
CPC ..... *H05B 33/0815* (2013.01); *H05B 33/0827* (2013.01); *H05B 33/0845* (2013.01); *H05B 33/0884* (2013.01); *H05B 33/0896* (2013.01); *H05B 37/0272* (2013.01)

(58) Field of Classification Search
CPC ............... H05B 33/08; H05B 33/0815; H05B 33/0824; H05B 33/0842; H05B 33/083; H05B 33/0845; H05B 33/0884; H05B 33/0896; H05B 37/02; H05B 37/0227; H05B 37/0281; G09G 3/20; G09G 3/2081; G09G 3/2088
See application file for complete search history.

(56) References Cited

U.S. PATENT DOCUMENTS

| 4,983,884 | A | 1/1991 | Wychulis |
| 9,030,122 | B2 | 5/2015 | Yan et al. |
| 9,402,286 | B2 | 7/2016 | Lin et al. |
| 2007/0188108 | A1 | 8/2007 | Chao et al. |
| 2007/0257623 | A1* | 11/2007 | Johnson ............ H05B 33/0818 315/193 |
| 2009/0116232 | A1* | 5/2009 | Chang ............... H05B 33/0818 362/231 |
| 2009/0225020 | A1* | 9/2009 | Ran ..................... G09G 3/3406 345/102 |
| 2010/0301751 | A1 | 12/2010 | Chobot et al. |

(Continued)

FOREIGN PATENT DOCUMENTS

| CN | 101018439 A | 8/2007 |
| CN | 101547540 A | 9/2009 |

(Continued)

OTHER PUBLICATIONS

U.S. Appl. No. 15/260,080, by Adolfo De Cicco et al., filed Sep. 8, 2016.

*Primary Examiner* — Thai Pham
(74) *Attorney, Agent, or Firm* — Shumaker & Sieffert, P.A.

(57) ABSTRACT

According to an example, a device is provided for driving several light sources, wherein the device is arranged to sense a supply signal and apply a phase shift to a switching signal of at least one of the several light sources based on the sensed supply signal. Also, accordingly a method, a lighting device, a computer program product and a computer-readable medium are suggested.

23 Claims, 9 Drawing Sheets

(56) References Cited

U.S. PATENT DOCUMENTS

| | | | |
|---|---|---|---|
| 2011/0133673 A1* | 6/2011 | Ryu | H05B 33/0821 |
| | | | 315/307 |
| 2011/0221795 A1 | 9/2011 | Ran et al. | |
| 2014/0354178 A1 | 12/2014 | Siessegger et al. | |
| 2014/0361696 A1* | 12/2014 | Siessegger | H05B 33/0803 |
| | | | 315/186 |
| 2016/0345392 A1 | 11/2016 | Scenini et al. | |
| 2016/0345397 A1 | 11/2016 | De Cicco et al. | |
| 2017/0025969 A1* | 1/2017 | Xu | H02M 3/33592 |

FOREIGN PATENT DOCUMENTS

| | | |
|---|---|---|
| CN | 102598853 A | 7/2012 |
| CN | 104137651 A | 11/2014 |
| KR | 20110034801 A | 4/2011 |

* cited by examiner

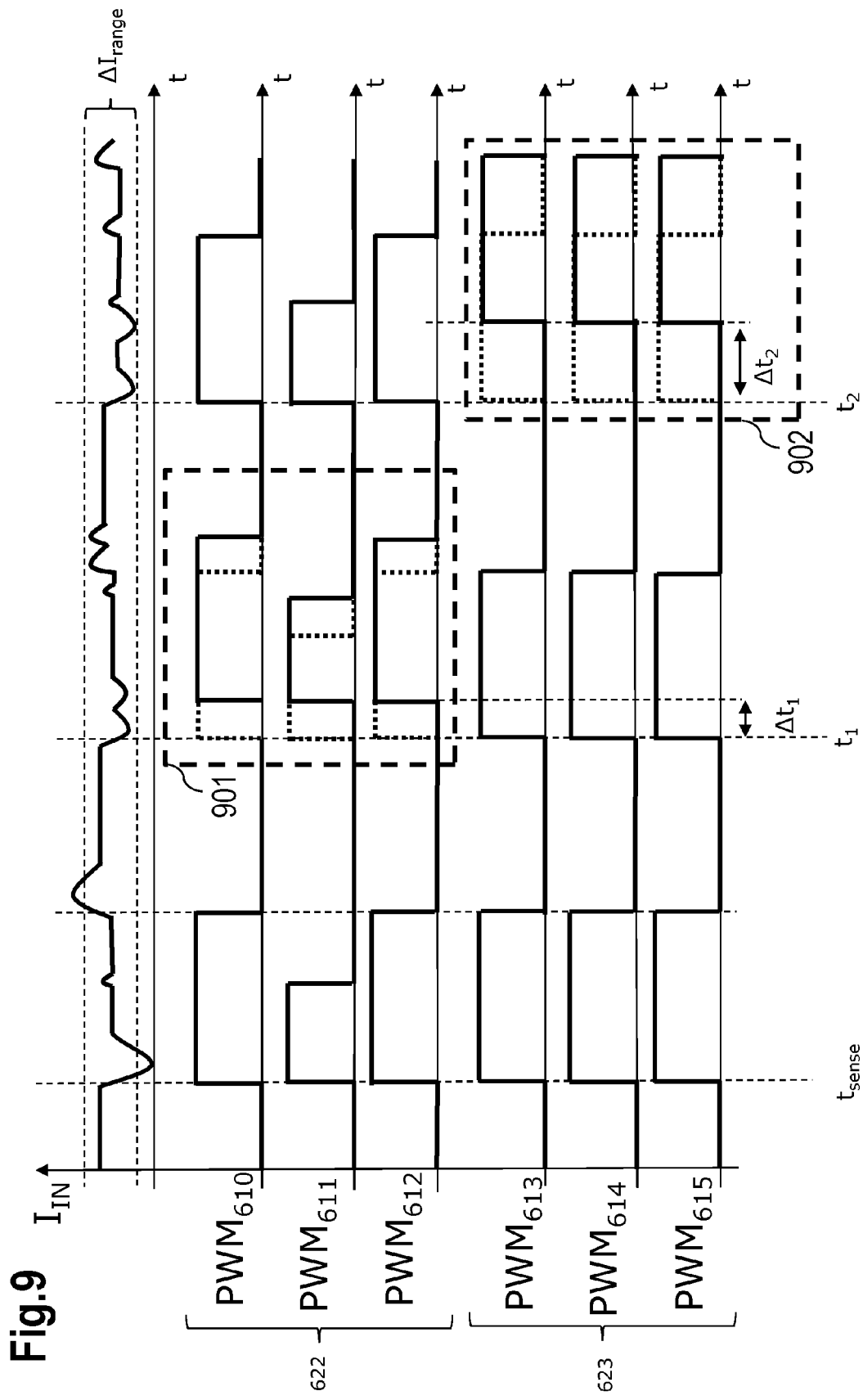

DRIVING SEVERAL LIGHT SOURCES

BACKGROUND OF THE INVENTION

Embodiments of the present invention relate to a device for driving several light sources. The light sources may in particular be LEDs arranged in a matrix structure (LED array).

SUMMARY

A first embodiment relates to a device for driving several light sources, wherein the device is arranged to:
- sense a supply signal;
- apply a phase shift to a switching signal of at least one of the several light sources based on the sensed supply signal.

A second embodiment relates to a lighting device comprising
- a matrix structure of light sources comprising at least two rows and at least two columns of light sources;
- a semiconductor device comprising
  - a light source driver matrix on top of which the matrix structure of light sources is arranged;
  - a common area;
  - wherein the light source driver matrix is arranged for driving the light sources, wherein the light source driver matrix is arranged to:
    - sense a supply signal;
    - apply a phase shift to a switching signal of at least one of the several light sources based on the sensed supply signal.

A third embodiment relates to a method for driving several light sources comprising the steps:
- sensing a supply signal;
- applying a phase shift to a switching signal of at least one of the several light sources based on the sensed supply signal.

A fourth embodiment is directed to a computer program product directly loadable into a memory of a digital processing device, comprising software code portions for performing the steps of the method described herein.

A fifth embodiment is directed to a computer-readable medium, e.g., storage of any kind, having computer-executable instructions adapted to cause a computer system to perform the steps of the method as described herein.

A sixth embodiment may be directed to a device for driving several light sources comprising:
- means for sensing a supply signal;
- means for applying a phase shift to a switching signal of at least one of the several light sources based on the sensed supply signal.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 9 shows signal diagrams comprising six switching signals with phase shifts applied to reduce the current ripple in the supply signal.

DETAILED DESCRIPTION OF THE PREFERRED EMBODIMENTS

Light sources, e.g., semiconductor light sources, LEDs (light emitting diodes), may be arranged together as an array. The array of light sources may be arranged on top of a semiconductor device (array) that is arranged as a control circuit for the light sources. The light sources may be mounted onto the semiconductor device. In case the semiconductor device provides a current source for each light source, such current source may have to be driven individually to allow controlling the respective light source.

Figure 1:
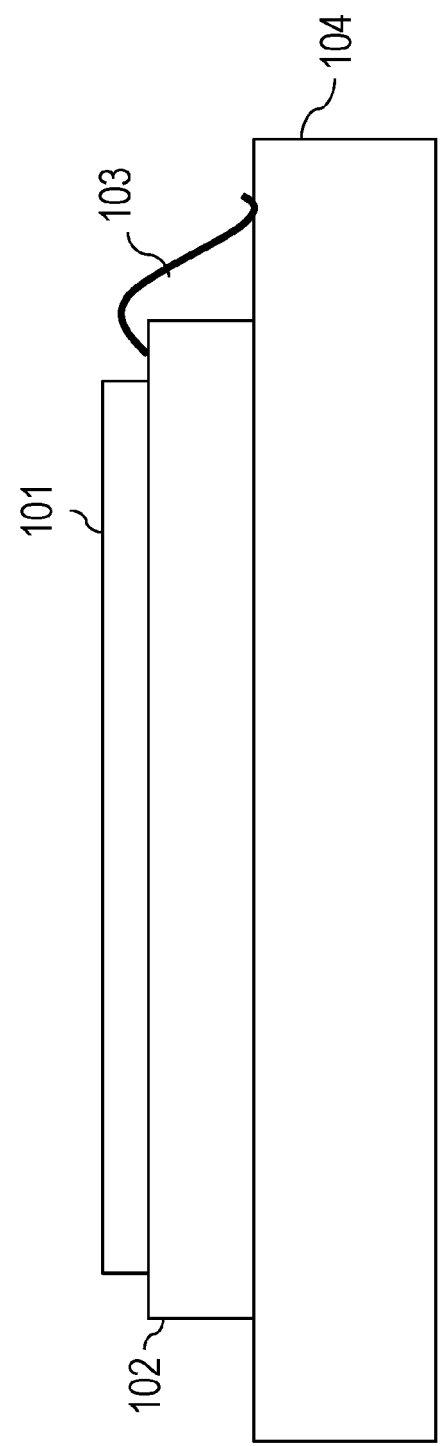
FIG. 1 shows an exemplary arrangement comprising an LED array which is placed on top of a semiconductor device.

FIG. 1 shows an exemplary arrangement comprising an LED array 101 which is placed on top of a semiconductor device 102. The semiconductor device 102 may be arranged on a printed circuit board (PCB) 104, e.g., a metallic core PCB 104. The PCB 104 may be electronically connected via bond wires 103. The LED array 101 mounted on the semiconductor device 102 is also referred to as chip-on-chip assembly.

The arrangement may comprise further components. These components may be a supply unit for supplying electrical energy; and/or a control logic for controlling the several light sources, e.g., a microcontroller and/or a field programmable gate array (FPGA). Some of these components may be an integral part of the semiconductor device 102. Some of these components may be arranged as discrete components on the PCB 104 and connected to the semiconductor 102 via PCB tracks. Some of these components may be arranged on another PCB (not shown) and electrically connected to the PCB 104 via a connection means, such as a physical connector.

The semiconductor device 102 may comprise at least one of the following:
- current sources for the individual LEDs arranged on the LED array 101, in particular at least one current source for each LED;
- an interface for driving the LEDs and for management purposes;
- generation of at least one reference current;
- diagnosis and protection functionality.

For such purpose, the semiconductor device 102 may comprise an array of silicon cells, wherein each silicon cell (also referred to as pixel cell) may comprise a current source, which may be directly connected to an LED of the LED array 101. In addition, the semiconductor device 102 may comprise a common circuitry.

Figure 2:
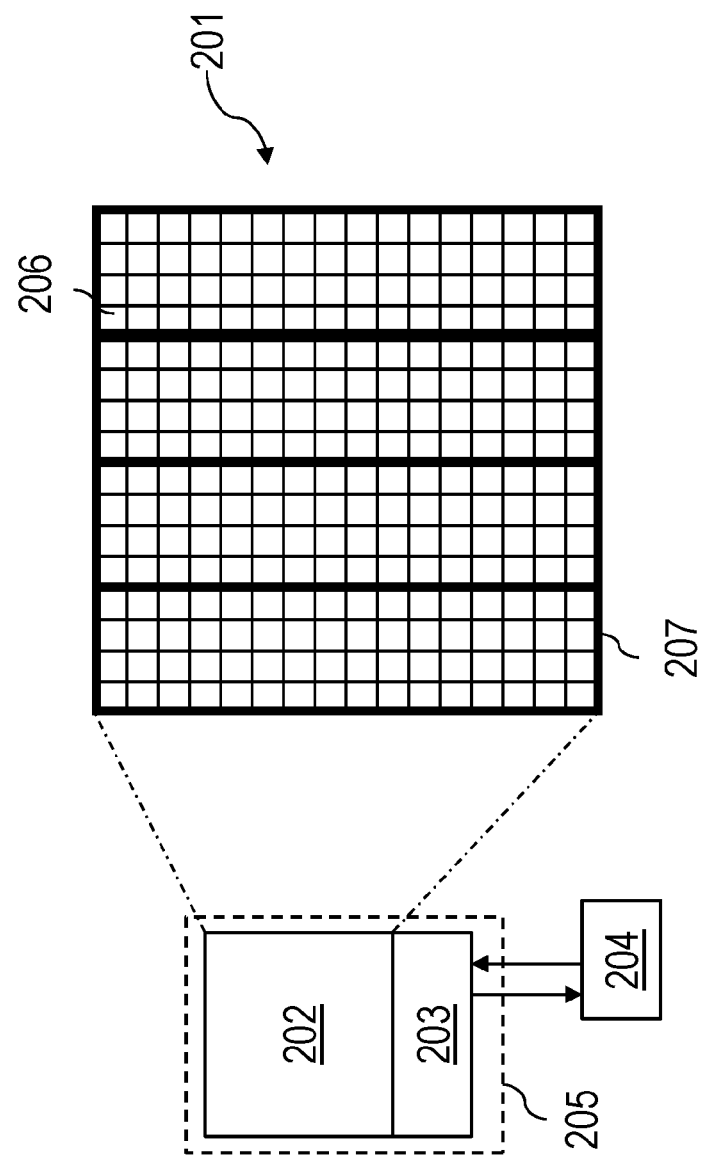
FIG. 2 shows an exemplary block diagram comprising a matrix of LEDs and a semiconductor device comprising an LED driver matrix and a common circuitry.

FIG. 2 shows an exemplary diagram comprising a matrix 201 of LEDs 206 (each pixel of the matrix may be represented by at least one LED) and a semiconductor device 205, which comprises an LED driver matrix 202 (i.e. a portion of the semiconductor device that is associated with one pixel of the LED array 101) and a common circuitry 203. The semiconductor device 205 may be connected to a serial interface 204. The respective LEDs 206 of the matrix 201 may be controlled via the serial interface 204. The matrix 201 may be arranged on top of the LED driver matrix 202. The LED driver matrix 202 may be part of the semiconductor device 102 as shown in FIG. 1 and it may comprise a pixel cell area (also referred to as "pixel cell") for each LED 206 of the matrix 201. It is an option that the LED driver matrix 202 has (e.g., substantially) the same area size as the matrix 201. In particular, the pixel cell area of the LED driver matrix 202 may have (substantially) the same surface area as the LED 206. The LEDs 206 of the matrix 201 may be directly connected to the pixel cells of the LED driver matrix 202. The matrix 201 may in particular be arranged on top of the LED driver matrix 202.

The common circuitry 203 may in particular comprise an interface for accessing the LEDs of the matrix 201, e.g., one register for configuration purposes, a reference current generator, a reference voltage generator and a temperature sensor.

The matrix 201 may comprise an arbitrary number of LEDs (pixels) arranged in columns and rows. The matrix 201 may comprise, e.g., 256 or 1024 LEDs. In the example shown in FIG. 2, the matrix 201 comprises 16 rows and 16 columns of LEDs 206 amounting to a total of 256 LEDs.

The LEDs 206 may be grouped (divided) into subgroups 207. Each subgroup 207 may be controlled (driven) independently. As an example, the number of subgroups (zones) of the matrix 201 is fixed. As another example, a variable number of subgroups is used in the matrix 201. As an example, the LEDs 206 may be fixedly grouped into four subgroups 207. Each subgroup 207 comprises 64 LEDs 206 (pixels).

It is noted that LED is mentioned as an example for a light source. It may be an option to use any kind of light source, in particular semiconductor light source. It is another option that each light source may be a module comprising at least two semiconductor light sources.

The common circuitry 203 may be arranged in an area adjacent or distant to the LED driver matrix 202.

Due to the compact arrangement, a high amount of heat sources may generate different temperatures, which may influence temperature gradients and hence lead to a mismatch between pixels.

In addition, the output of each current source per pixel cell may not be directly accessible as the LED driver matrix is directly connected to the LEDs.

Hence, it may be desirable to provide at least one of the following:
 a current source that provides current to the individual LED, which allows switching the LED on or off with high accuracy and providing over-current protection;
 a diagnostic functionality capable of detecting an open-load and a short to ground of the output channel;
 a low mismatch between different pixels, i.e. between different current sources;
 driving the LEDs to adjust load conditions.

Figure 3:
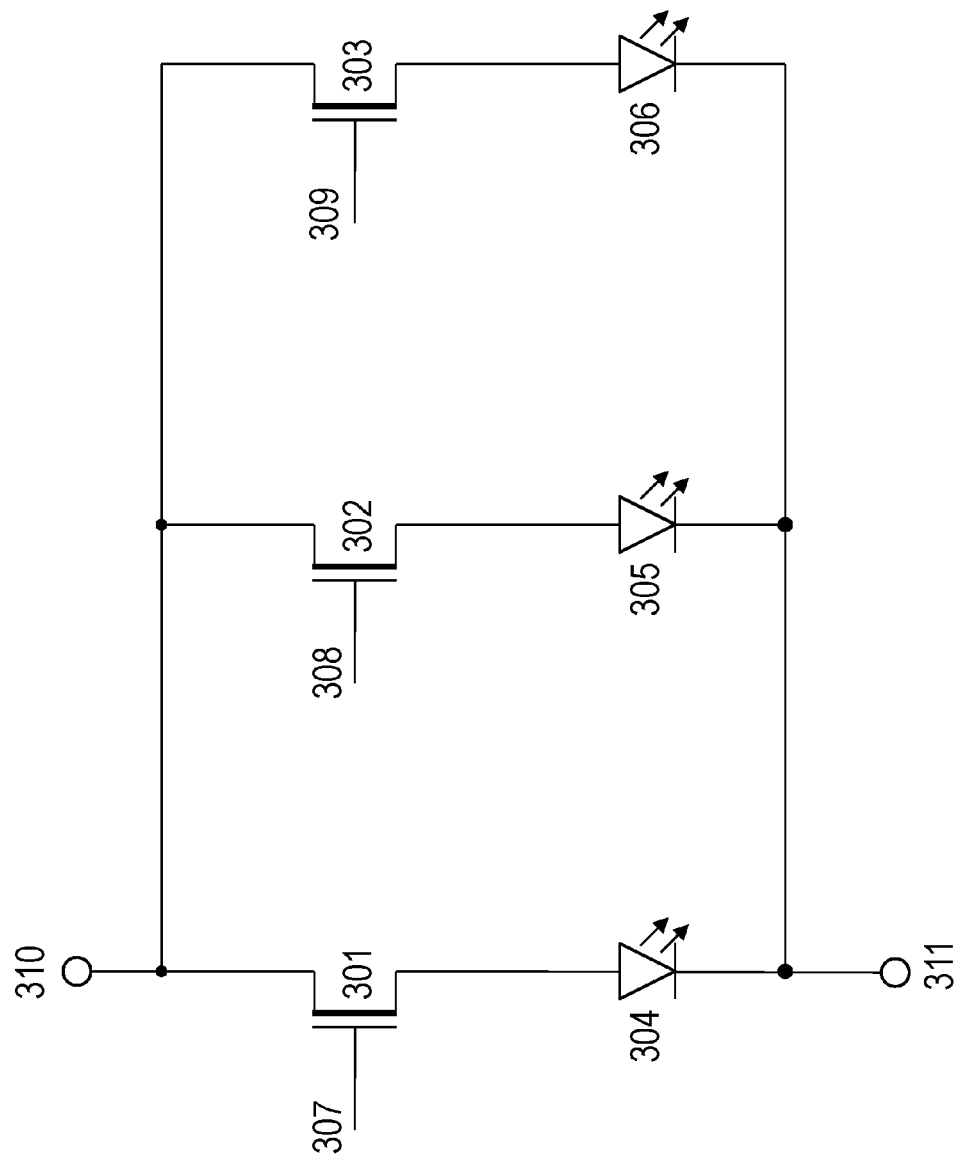
FIG. 3 shows current sources, each of which being arranged on the LED driver matrix on top of which LEDs are mounted.

FIG. 3 shows three exemplary high-side current sources 301 to 303, each of which may be arranged on the LED driver matrix on top of which LEDs 304 to 306 are mounted. In this scenario, the LED 304 is arranged on top of the current source 301, the LED 305 is arranged on top of the current source 302 and the LED 306 is arranged on top of the current source 303.

The current source 301 may be an NMOS power stage with its drain connected to a supply node 310. The source of the current source 301 is connected to an anode of the LED 304. The cathode of the LED 304 is connected to ground 311. A switching signal 307 may be provided to the gate of the current source 301. The switching signal 307 can be a digital or an analog signal, e.g., a PWM signal.

The current source 302 may be an NMOS power stage with its drain connected to the supply node 310. The source of the current source 302 is connected to an anode of the LED 305. The cathode of the LED 305 is connected to ground 311. A switching signal 308 may be provided to the gate of the current source 302. The switching signal 308 can be a digital or an analog signal, e.g., a PWM signal.

The current source 303 may be an NMOS power stage with its drain connected to the supply node 310. The source of the current source 303 is connected to an anode of the LED 306. The cathode of the LED 306 is connected to ground 311. A switching signal 309 may be provided to the gate of the current source 303. The switching signal 309 can be a digital or an analog signal, e.g., a PWM signal.

Additional error amplifiers (not shown in FIG. 3) for each current source 301 to 303 may be used to control an output current. Each of the error amplifiers can be enabled by a digital or by an analog signal.

An LED driver matrix may comprise a large number of current sources and/or switches on the area available for a pixel cell (e.g., in case the LED driver matrix is below the LED array).

Examples presented herein in particular show how an efficient solution for the LED array and the underlying LED driver matrix may be realized even if the LED driver matrix is arranged on a silicon semiconductor device (e.g., single chip). Examples provided in particular cope with a high number of heat sources as well as heat gradients between current sources of the pixel cells.

Examples presented herein allow providing an LED driver matrix comprising in particular at least one of the following:
 a communication interface for controlling the drivers for each pixel cell and/or a (sub)group of pixel cells;
 an output current regulation with self-protection against over-current;
 an open-load and short to ground diagnostic functionality;
 a low temperature sensitivity.

This may in particular be achieved by distributing a control logic between a common circuitry and the LED driver matrix, both integrated on the semiconductor device. The common circuitry may be arranged adjacent to the LED driver matrix and the LED driver matrix may take the same surface area than the LED array, which can be arranged on top of the LED driver matrix as explained above.

As an option, the common circuitry may be arranged in an area adjacent or distant to the LED driver matrix.

It is challenging to efficiently drive the current sources, especially when one current source is placed (or associated with) a pixel cell. The distance between two pixel cells (e.g., less than 150 μm) may set forth limiting restrictions, which makes it difficult to electrically connect all current sources that are arranged below their associated light sources such that they can be driven by the common circuitry of the semiconductor device.

Figure 4:
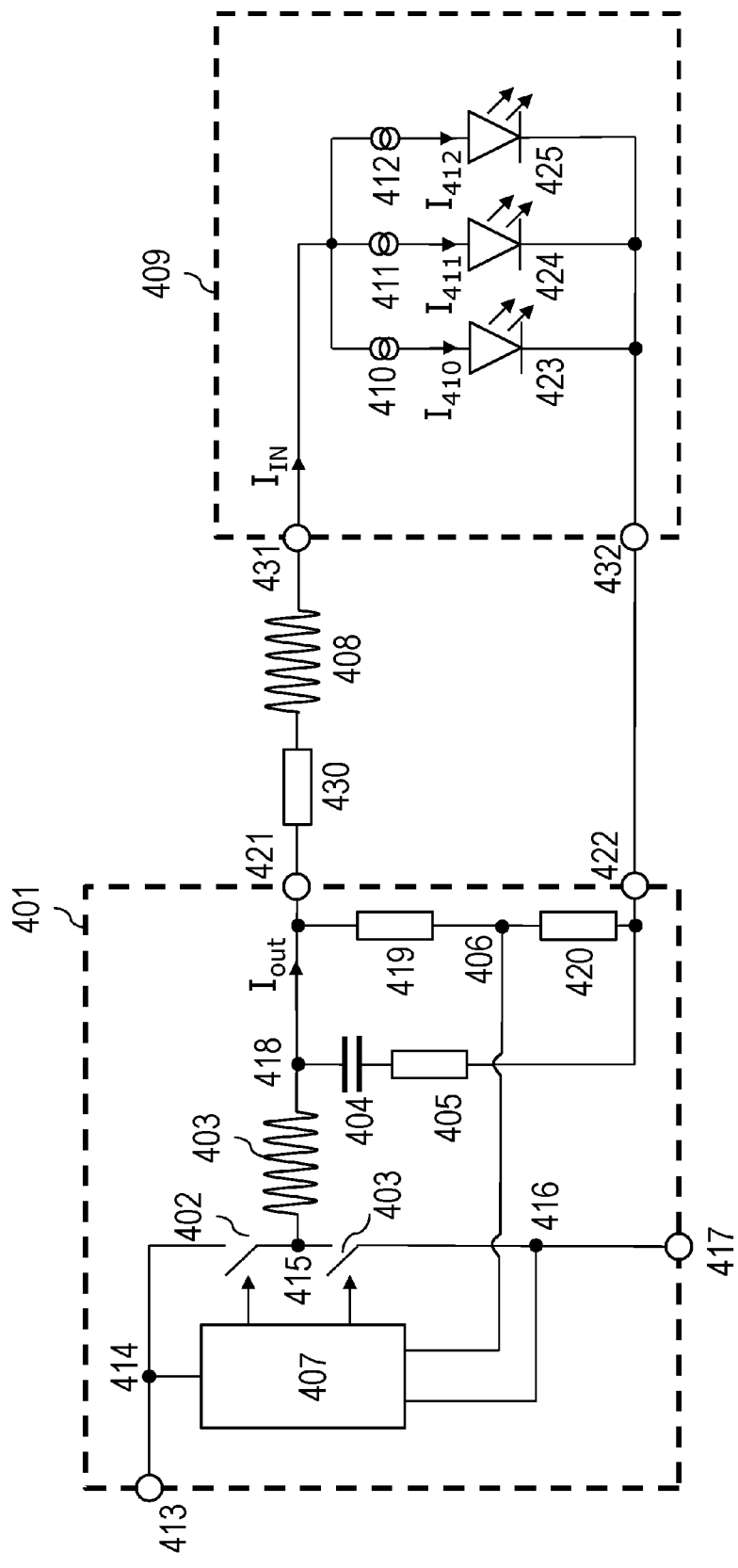
FIG. 4 shows an exemplary supply unit connected to the arrangement of FIG. 1.

FIG. 4 shows a supply unit 401 for the LED driver matrix in combination with an arrangement 409 comprising the LEDs and the semiconductor device driving the LEDs.

The supply unit 401 may be arranged externally from the LED driver matrix 202 or it may be a part of the semiconductor device comprising the LED driver matrix. The supply unit 401 may also be a part of the common circuitry. As an alternative, the supply unit 401 can be a discrete component on the PCB. The supply unit 401 can be connected to the semiconductor device by connector means, e.g., via PCB tracks or via a discrete connector. In particular, the supply unit 401 may comprise an interface for providing an electrical supply signal, such as a supply current or a supply voltage, to the LED driver matrix.

The supply unit 401 comprises a DC supply input 413. The DC supply input 413 is connected to a node 414. The node 414 is connected to an input of a control unit 407. The node 414 is further connected to a first pin of a switch 402. A second pin of the switch 402 is connected to a node 415. A first pin of a switch 403 is connected to the node 415. A second pin of the switch 403 is connected to a node 416. An output of the control unit 407 is connected to the node 416. A power ground output 417 of the supply unit 401 is connected to the node 416.

The control unit 407 provides a first switching signal to the switch 402 to open or close a connection from the node 414 to the node 415. The control unit 407 provides a second switching signal to the switch 403 to open or close a connection from the node 415 to the node 416. It is noted that the switches 402 and 403 may be or comprise electronic switches, e.g., transistors or MOSFETs.

The node 415 is connected via an inductor 403 to a node 418. The node 418 is connected via a series-connection comprising a capacitor 404 and a resistor 405 to an output 422 of the supply unit 401. The output 422 may be connected to ground.

The node 418 is connected via a a resistor 419 to a node 406. The node 406 is connected via a resistor 420 to the output 422. The node 406 is connected to an input of the control unit 407. The node 418 is connected to a supply output 421 of the supply unit 401.

The supply unit 401 can be connected to an arrangement 409. The arrangement 409 may comprise the semiconductor device, in particular the LED matrix and/or the common circuitry.

The supply output 421 of the power supply unit 401 is connected via a series-connection of a resistor 430 and an inductor 408 to a terminal 431 of the arrangement 409. It is noted that the resistor 430 may be a result of the parasitic wire resistance and the inductor 408 may be a result of parasitic inductances. The terminal 431 may correspond to the supply node 310 of FIG. 3; hence, a supply signal, such as a supply voltage or a supply current $I_{IN}$ can be conveyed via this terminal 431.

The output 422 of the supply unit 401 is connected a terminal 432 of the arrangement 409 (which may be connected to ground). The terminal 432 may correspond to ground 311 as indicated in FIG. 3.

The arrangement 409 comprises three exemplary high-side current sources 410 to 412, each of which may be arranged on the LED driver matrix on top of which the LEDs 423 to 425 are mounted.

The current source 410 is connected to an anode of an LED 423 and provides a current $I_{410}$. A cathode of the LED 423 is connected to the terminal 432. A switching signal $PWM_{410}$ (not shown) may be applied to the current source 410 to control the output current $I_{410}$. The current source 410 may correspond to the current source 301, the LED 423 may correspond to the LED 304 and the switching signal $PWM_{410}$ may correspond to the switching signal 307 (see FIG. 3).

The current source 411 is connected to an anode of an LED 424 and provides a current $I_{411}$. A cathode of the LED 424 is connected to the terminal 432. A switching signals $PWM_{411}$ (not shown) may be applied to the current source 411 to control the output current $I_{411}$. The current source 411 may correspond to the current source 302, the LED 424 may correspond to the LED 305 and the switching signal $PWM_{411}$ may correspond to the switching signal 308 (see FIG. 3).

The current source 412 is connected to an anode of an LED 425 and provides a current $I_{412}$. A cathode of the LED 425 is connected to the terminal 432. A switching signals $PWM_{412}$ (not shown) may be applied to the current source 412 to control the output current $I_{412}$. The current source 412 may correspond to the current source 303, the LED 425 may correspond to the LED 306 and the switching signal $PWM_{412}$ may correspond to the switching signal 309 (see FIG. 3).

The switching signals $PWM_{410}$, $PWM_{411}$, $PWM_{412}$ may be pulse width modulated signals used for dimming purposes. These signals may be generated by a control logic (not shown in FIG. 4).

The supply unit 401 can be a DC to DC converter (DC: direct current). A buck converter (step-down converter) is one example of a DC to DC converter. This buck converter steps down voltage (while stepping up current). It typically comprises two semiconductor switches, e.g., the switches 402 and 403, which are arranged as a half-bridge circuit that is controlled by the control unit 407. The buck converter further comprises at least one energy storage, e.g., the inductor 403. To reduce a voltage ripple, a filter unit, e.g., the capacitor 404 and the resistor 405, may be supplied at the output of the buck converter. The buck converter also comprises a feedback loop, e.g., the resistors 419, 420 that provide a feedback signal at the node 406, which is used to adjust the switching signals of the control unit 407. This may be achieved by adjusting the switching period or the duty cycle of the switches 402, 403.

The supply unit 401 is configured to provide an electrical supply signal for driving the several light sources. The supply unit 401 is configured to provide sufficient energy to satisfy a condition in which all LEDs 423 to 425 or at least a majority of the LEDs 423 to 425 in the arrangement 409 may be switched-on simultaneously. Such a condition can cause a significant ripple ΔI in the supply current (or accordingly a ripple in the supply voltage) and may decrease the efficiency of the LED array. This is exemplarily shown in FIG. 7.

The supply unit 401 provides a current $I_{out}$ at the supply output 421. This current $I_{out}$ needs to be high enough to supply all LEDs 423 to 425 or at least a majority of these LEDs 423 to 425, in particular when they are switched on simultaneously. Hence, the current sources 410 to 412 have to provide sufficient output current $I_{410}$ to $I_{412}$ for operating the LEDs 423 to 425. Provisioning such an amount of current $I_{410}$ to $I_{412}$ may cause high supply signal ripple (in the voltage and/or current domain) especially in case PWM signals are used as switching signals for the LEDs 423 to 425. The supply signal ripple may be further increased when the supply unit 401 is arranged externally from the arrangement 409, since additional parasitic effects of a long connection indicated by the resistor 430 and the inductor 408 become increasingly relevant. The supply signal ripple may yet be further increased if the capacitor 404 is used as a filter element that comprises a high Equivalence Series Resistance (ESR).

Figure 7:
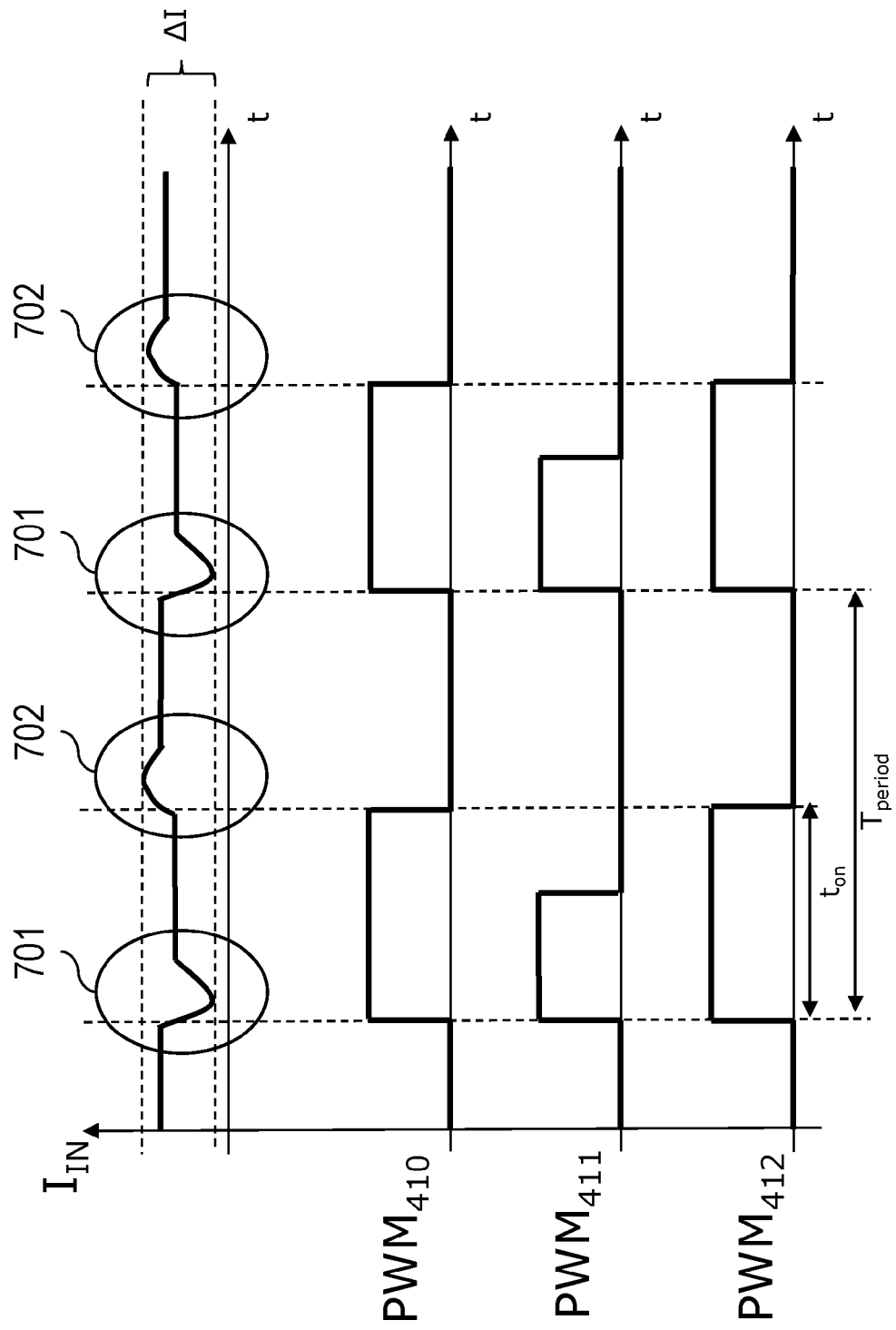
FIG. 7 shows signal diagrams comprising three switching signals and a resulting supply signal comprising a current ripple.

FIG. 7 shows an exemplary supply signal sequence of the supplied input current $I_{IN}$ of the supply unit 401 of FIG. 4 and three PWM dimming signals $PWM_{410}$, $PWM_{411}$, $PWM_{412}$ as exemplary switching signals for driving the LEDs 423, 424, 425. Each PWM dimming signal $PWM_{410}$, $PWM_{411}$, $PWM_{412}$ is a periodic signal having a duty cycle. A duty cycle of a PWM signal describes the proportion of the respective "ON-time" $t_{on}$ in reference to a time period $T_{period}$. The duty cycle can be expressed in percent: a duty cycle of 100% is a PWM signal that is switched-on over the complete time period $T_{period}$.

In FIG. 7 the rising edges of the PWM signals $PWM_{410}$, $PWM_{411}$, $PWM_{412}$ are aligned, i.e. the rising edges occur simultaneously, which corresponds to the use-case that all LEDs 423 to 425 are to be switched-on simultaneously. Hence, the load condition of the supply unit 401 changes abruptly with the simultaneously rising (switching on) or falling (switching off) edges of the PWM signals.

These abrupt changes of the load condition leads to current ripples 701 for simultaneously rising edges and current ripples 702 for simultaneously falling edges of the PWM signals.

It is noted that switching of "all" LEDs is used as an example to illustrate the problem. It is, of course, an option to switch also a group of LEDs, in particular not all LEDs, at the same time. This refers to switching on as well as to switching off. It is also noted that not the same number of LEDs has to be switched on and off.

It is an exemplary objective to efficiently manage an amount of supply energy (voltage or current) when LEDs are to be switched on and off, in particular if PWM dimming used. It is in particular an exemplary objective to reduce the power dissipation. It is further an exemplary objective to provide a continuous and variable energy supply when PWM dimming is used for each pixel cells or to a group of pixel cells of an LED array.

One further objective is to reduce a ripple in a supply signal (see ripples 701, 702 in FIG. 7). This may be beneficial in order to reduce the electromagnetic interference (EMI) via a reduced amount of current variations over time (dI/dt).

The ripple of the energy supply signal may in particular be reduced by applying a flexible, e.g., random, pseudo-random or deterministic, phase shift to an electrical supply signal that is applied to at least one light source, in particular to a group of several light sources. The light sources may be light sources arranged in an array as described herein. It is an option that the phase shift is applied if the energy supply signal (e.g., current or voltage) is outside a predetermined signal value range.

Figure 5:
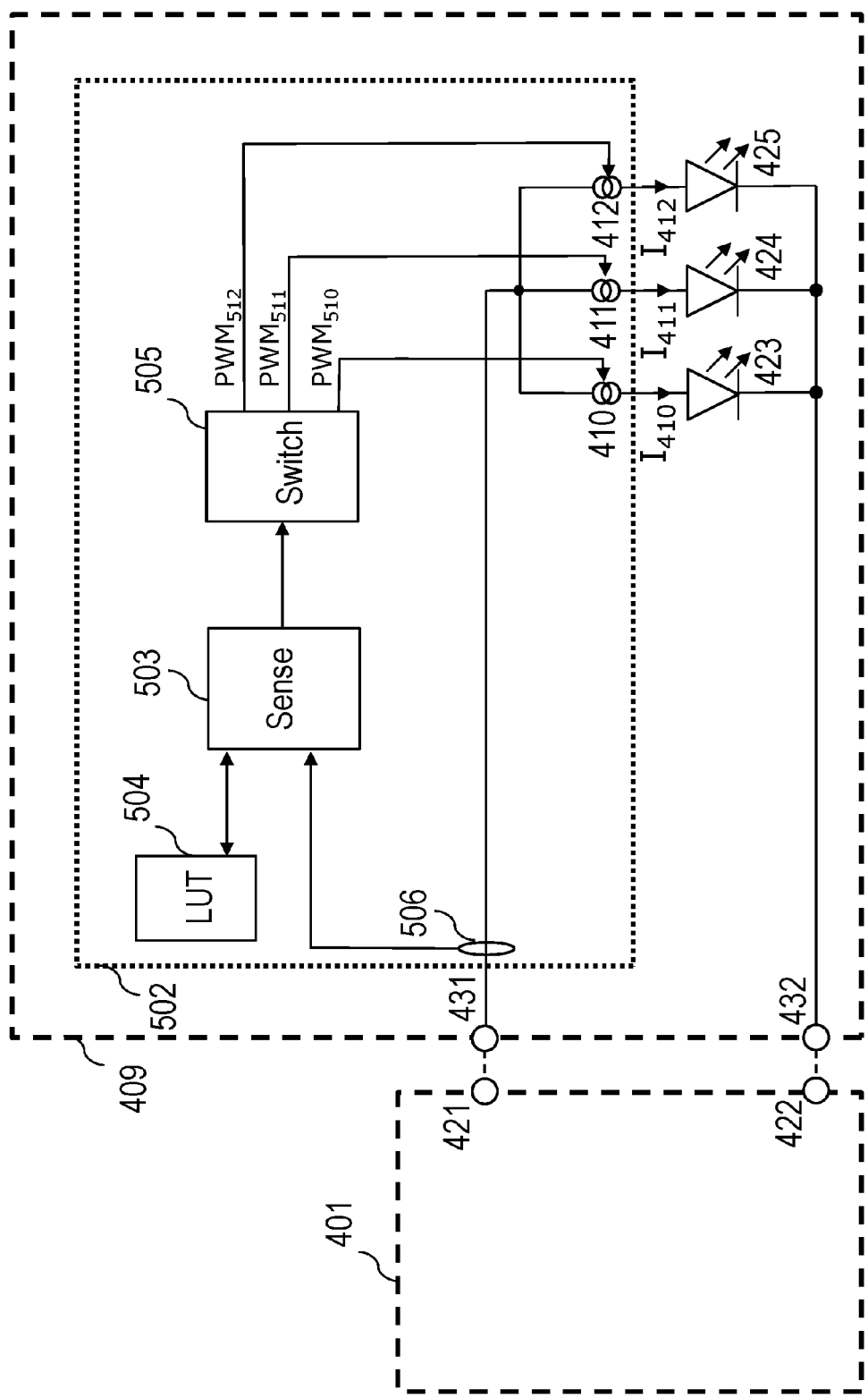
FIG. 5 shows a control logic for applying phase shifts to switching signals.

FIG. 5 shows the supply unit 401 and the arrangement 409 of FIG. 4, wherein the arrangement 409 comprises an exemplary control logic 502. The terminal 431 is connected to the supply output 421 and the terminal 432 is connected to ground 422.

The control logic 502 can be used to apply a phase shift to the switching signals of the LEDs 423 to 425.

The control logic 502 comprises a sensing unit 503 that is configured to sense an actual supply signal, e.g., a supply voltage $V_{CC}$ or a supply current, provided at the terminal 431 via a measuring means 506. The measuring means 506 may be a shunt resistor for determining a voltage drop across such shunt resistor, which is proportional to a current that is conveyed at the terminal 431.

The sensing unit 503 is also connected to a Lookup-Table (LUT) 504. An output of the sensing unit 503 is connected to a switching unit 505, which supplies switching signals $PWM_{510}$, $PWM_{511}$, $PWM_{512}$ towards the current sources 410 to 412.

The switching signal $PWM_{510}$ is used to control the current source 410, which adjusts the output current $I_{410}$ supplied to the LED 423. This can be achieved, e.g., via the gate of the current source 301 (for the LED 304, which would then correspond to the LED 423) as shown in FIG. 3.

The switching signal $PWM_{511}$ is used to control the current source 411, which adjusts the output current $I_{411}$ supplied to the LED 424. This can be achieved, e.g., via the gate of the current source 302 (for the LED 305, which would then correspond to the LED 424) as shown in FIG. 3.

The switching signal $PWM_{512}$ is used to control the current source 412, which adjusts the output current $I_{412}$ supplied to the LED 425. This can be achieved, e.g., via the gate of the current source 303 (for the LED 306, which would then correspond to the LED 425) as shown in FIG. 3.

The LEDs 423 to 425 may each comprise at least one light source, in particular a semiconductor light source, e.g., an LED, an OLED or the like. The LEDs 423 to 425 may each represent in particular a group of light sources.

The sensed signal obtained via the sensing unit 503 may be used to determine whether the supply signal at the terminal 431 is outside a predetermined range. This can be achieved by comparing the sensed signal with at least one predetermined value. Several predetermined values may be used to detect whether the sensed signal is within a predetermined range.

The LUT 504 may contain information to adapt the switching signals $PWM_{510}$, $PWM_{511}$, $PWM_{512}$ by applying a phase shift to the switching signals $PWM_{510}$, $PWM_{511}$, $PWM_{512}$ in order to reduce the supply signal ripple of the actually sensed supply signal. In particular, different phase shifts may be applied to at least a portion of the switching signals $PWM_{510}$, $PWM_{511}$, $PWM_{512}$.

Figure 8:
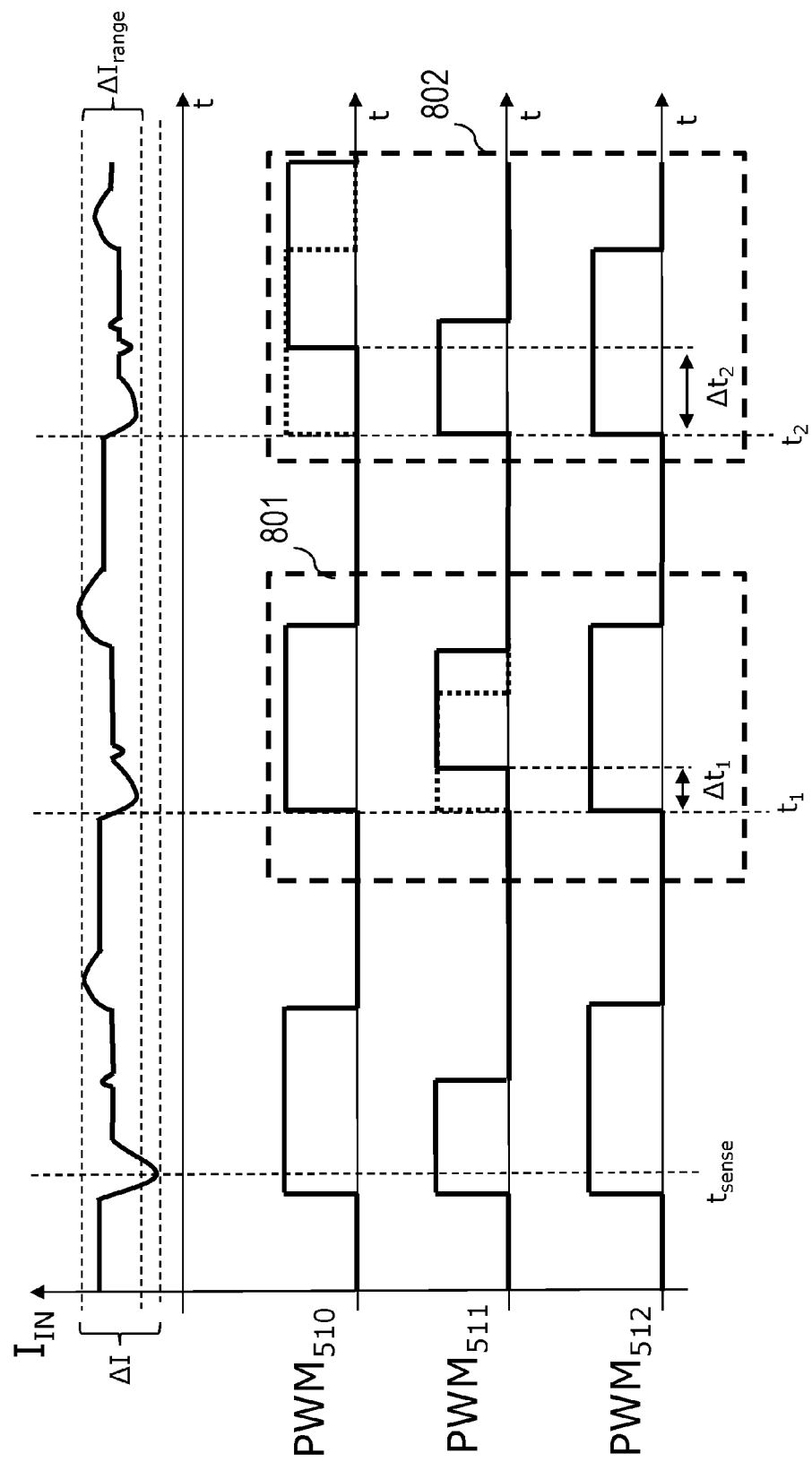
FIG. 8 shows signal diagrams comprising three switching signals with phase shifts applied to reduce the current ripple in the supply signal.

FIG. 8 shows an exemplary signal sequence of the input current $I_{IN}$ at the terminal 431. This input current $I_{IN}$ is sensed by the sensing unit 505. FIG. 8 also shows the switching signals $PWM_{510}$, $PWM_{511}$, $PWM_{512}$ for controlling the current sources 410 to 412 that drive the LEDs 423 to 425. As indicated above, the switching signals $PWM_{510}$, $PWM_{511}$, $PWM_{512}$ may in particular be pulse-width-modulated switching signals that are used for dimming the LEDs 423 to 425.

An abrupt change of the load condition may lead to a ripple $\Delta I$ of the input current $I_{IN}$ (or as an alternative: a ripple in the input voltage). Based on the various ripples, a range of the supply signal can be determined via the sensing unit 505. In the example shown in FIG. 8, the range of the supply signal is a current range $\Delta I_{range}$.

Hence, the efficiency of the LED driver matrix increases and the power consumption is reduced if the supply signal is within such range.

In FIG. 8 different portions 801, 802 of the switching signals show a phase shift that is applied to the respective switching signals. It is noted that the phase shift can be applied differently to different portions 801, 802 of the switching signals.

The control logic 502 may apply an algorithm (which may be an adaptive algorithm) to provide phase shifts (in particular: at least one phase shift) between at least two of the switching signals $PWM_{510}$, $PWM_{511}$, $PWM_{512}$ in order to reduce the load condition for the supply unit 401 and as a consequence, to reduce the ripple.

The sensing unit 503 senses the current at the terminal 431 at a time $t_{sense}$. The sensing unit 503 detects that the current sensed undershoots the current range $\Delta I_{range}$ by comparing the current sensed with a predetermined value.

The reason for the undershoot of the sensed current is based on a command that requires all LEDs 423 to 425 to be switched-on at the same time (see the rising edges of the switching signals prior to the time $t_{sense}$). Detecting the undershoot may trigger the control logic 502 to adaptively reduce the ripple of the input current $I_{IN}$.

This may be achieved by the (adaptive) algorithm that may be triggered for each dimming period (time period of a switching cycle) or any multitude thereof. For at least two switching signals, a phase shift between the rising edges and/or the falling edges is introduced. In one example, several phase shifts are introduced between each two edges, which may be falling or rising edges. The phase shifts may in particular at least partially differ from each other. Hence, by introducing such phase shifts, the LEDs are no longer switched on at the same time and/or switched off at the same time.

In other words, an offset to the switching times is supplied via the phase shifts. The phase shifts may be random or pseudo-random. They may also be deterministic pursuant to a predefined order, which may be stored in a memory, e.g., said LUT 504. The phase shift referred to herein may in particular have an arbitrary range to avoid that the LEDs (or a group of LEDs) are switched on simultaneously. The same applies to switching off accordingly.

With regard to portion 801 the switching logic 505 introduces a phase shift $\Delta t_1$ (also referred to as "delay") to the rising edge of the switching signal $PWM_{511}$ (the signal without the phase shift is indicated as a dotted line). The phase shift $\Delta t_1$ may be stored in and obtained from the LUT 504. As shown in FIG. 8, due to the phase shift $\Delta t_1$ introduced to the switching signal $PWM_{511}$ the ripple in the input current $I_{IN}$ shortly after a time $t_1$ is reduced compared to the ripple at the time $t_{sense}$.

With regard to portion 802 the switching logic 505 introduces a phase shift $\Delta t_2$ to the rising edge of the switching signal $PWM_{510}$ (the signal without the phase shift is indicated as a dotted line). The phase shift $\Delta t_2$ may be stored and obtained from the LUT 504. This phase shift $\Delta t_2$ is different from the phase shift $\Delta t_1$ and it may lead to a reduced load condition at a time $t_2$ and a reduced current ripple without an overshoot caused by the falling edges of the PWM signals.

The algorithm may utilize different phase shifts and determine the results for each or for a combination of phase shifts applied to the switching signals. In this regard, FIG. 8 shows an example for two phase shifts $t_1$ and $t_2$ applied to two out of three switching signals (at different times). Accordingly, several phase shifts could be used per portion 801, 802 to determine which combination of phase shifts works best to reduce the ripple. The algorithm may hence operate in an adaptive manner to determine a suitable combination of phase shifts applied per portion. The algorithm may be run until a suitable result is determined, e.g., until the ripple remains within the current range $\Delta I_{range}$ (or in general: within the range of the supply signal). Thus, the evaluated phase shifts can be used for driving the LEDs in particular as long as no other driving command is received by the control logic 502.

As an alternative, the algorithm may terminate as soon as a predetermined number of phase shifts have been applied. This predetermined number may be obtained during a training phase to assure that it leads to a reduction of the ripple in the supply signal and that the sensed supply signal remains (with a high likelihood) within the current range $\Delta I_{range}$.

A number n of phase shifts $\Delta t_i$ (i=1, . . . , n) may be limited to a minimum or small set of phase shifts to reduce the time that is required to reduce the ripple in the supply signal (in this example the current is exemplarily used as supply signal; however, a voltage could be used accordingly). Also, a small set of phase shifts may reduce the computational effort provided by the control logic 502.

To assure a small number of phase shifts, the LUT 504 may contain additional information that can be used to adapt the switching signals.

The algorithm to determine the phase shifts may be (re-)started when it is sensed that the supply signal is outside the predetermined range.

The phase shift may be applied to a switching signal of each pixel cell. It is also an option that several light sources can be combined as a group and the phase shift is applied to such group of light sources. This may beneficially reduce the size of the LUT 504 compared to the scenario where each pixel cell is handled individually.

The number of groups may be fixed. Alternatively, a variable number and/or a variable size of groups may be applied that varies depending on an actual load condition of the supply unit. An information to adapt the group settings may be stored in the LUT 504.

Figure 6:
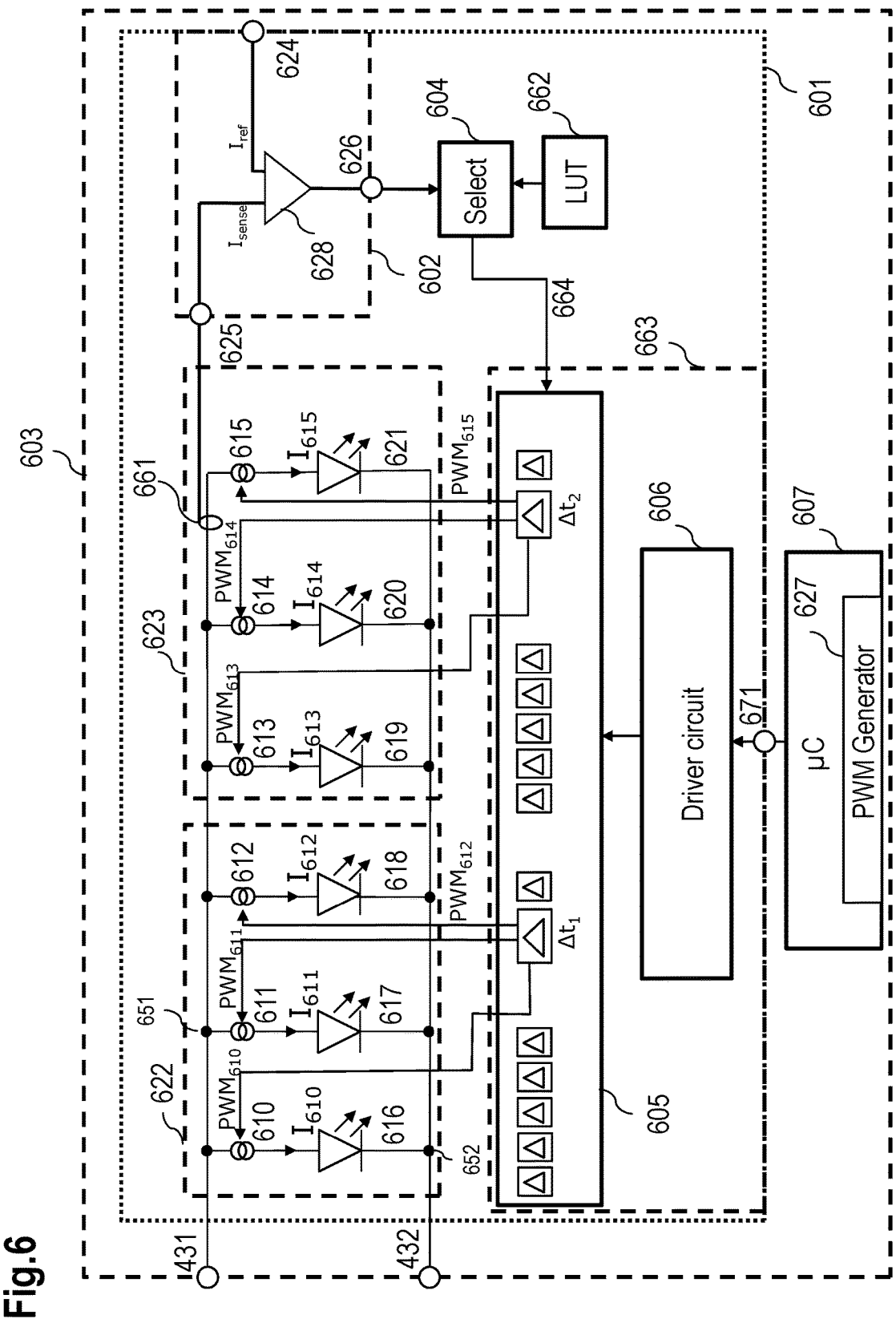
FIG. 6 shows a control logic for applying phase shifts to switching signals via a delay array.

FIG. 6 shows an alternative arrangement 603, which may be based on the arrangement 409 as shown in FIG. 4 and in FIG. 5. The arrangement 603 comprises the terminals 431 (to which the supply signal is provided) and 432 (which may be connected to ground), LEDs 616 to 621, a control logic 601 for applying phase shifts to switching signals $PWM_{610}$, $PWM_{611}$, $PWM_{612}$, $PWM_{613}$, $PWM_{614}$, $PWM_{615}$ of the LEDs 616 to 621 and a microcontroller 607.

The control logic 601 comprises LEDs 616 to 621, power sources 610 to 615, a sensing unit 602, a selecting unit 604, a lookup-table (LUT) 662, a switching unit 663 and a measuring means 661.

The terminal 431 is connected to a node 651 and the terminal 432 is connected to a node 652. Between the node 651 and the node 652 the following is arranged:
- a series connection comprising the current source 610 and the LED 616, wherein the cathode of the LED 616 is connected to the node 652 and the anode of the LED 616 is connected across the current source 610 to the node 651;
- a series connection comprising the current source 611 and the LED 617, wherein the cathode of the LED 617 is connected to the node 652 and the anode of the LED 617 is connected across the current source 611 to the node 651;
- a series connection comprising the current source 612 and the LED 618, wherein the cathode of the LED 618 is connected to the node 652 and the anode of the LED 618 is connected across the current source 612 to the node 651;
- a series connection comprising the current source 613 and the LED 619, wherein the cathode of the LED 619 is connected to the node 652 and the anode of the LED 619 is connected across the current source 613 to the node 651;
- a series connection comprising the current source 614 and the LED 620, wherein the cathode of the LED 620 is connected to the node 652 and the anode of the LED 620 is connected across the current source 614 to the node 651; and a series connection comprising the current source 615 and the LED 621, wherein the cathode of the LED 621 is connected to the node 652 and the anode of the LED 621 is connected across the current source 615 to the node 651.

The switching signal $PWM_{610}$ is provided to a control the current source 610, which supplies a current $I_{610}$ towards the LED 616. The switching signal $PWM_{611}$ is provided to a control the current source 611, which supplies a current $I_{611}$ towards the LED 617. The switching signal $PWM_{612}$ is provided to a control the current source 612, which supplies a current $I_{612}$ towards the LED 618. The switching signal $PWM_{613}$ is provided to a control the current source 613, which supplies a current $I_{613}$ towards the LED 619. The switching signal $PWM_{614}$ is provided to a control the current source 614, which supplies a current $I_{614}$ towards the LED 620. The switching signal $PWM_{615}$ is provided to a control the current source 615, which supplies a current $I_{615}$ towards the LED 621.

The current source 610 to 615 may be realized according to the NMOS power stages as shown in FIG. 3. The switching signal may be applied to the gate of such NMOS power stage.

In the example shown in FIG. 6, a group 622 comprises the LEDs 616, 617, 618 and a group 623 comprises the LEDs 619, 620, 621. It is an option that the number of groups and/or the number of LEDs within one group may vary.

The LEDs 616 to 621 may each be an individual LED or they may be combined in at least one group of LEDs. The LEDs 616 to 621 may be part of an LED array.

The measuring means 661 may be configured to sense a supply signal at the node 651. The output of the measuring means 661 is conveyed as a sense current $I_{sense}$ to a terminal 625 of the sensing unit 602, which is connected to a first input of a comparison unit 628 of the sensing unit 602. The sensing unit 602 comprises an input 624 to which a reference signal $I_{ref}$ can be supplied, wherein this input 624 is connected to a second input of the comparison unit 628. The reference signal $I_{ref}$ may correspond to a predetermined range of the supply signal. The reference signal $I_{ref}$ may be provided from the control logic 601 and/or a driver circuit 606 and/or the microcontroller 607.

The output of the comparison unit 628 is connected to an output node 626, which is fed to an input of the selecting unit 604. The LUT 662 is accessible to the selecting unit 604.

The selecting unit 604 provides a select signal to the switching unit 663, which comprises a driver circuit 606 and a time delay array 605.

The driver circuit 606 is connected to the microcontroller 607 via a serial interface 671 and provides switching signals to the delay array 605. The delay array 605 comprises time delay elements to provide phase shifts (delays) for the switching signals supplied by the driver circuit 606.

The select signal 664 from the selecting unit 604 is provided to the delay array 605. The switching unit 663 comprises six outputs that supply the switching signals $PWM_{610}$, $PWM_{611}$, $PWM_{612}$, $PWM_{613}$, $PWM_{614}$, $PWM_{615}$ to the current sources 610, 611, 612, 613, 614, 615. Hence, the delay array 605 is arranged to introduce phase shifts (i.e. delays) to the switching signals provided by the driver circuit 606.

The serial interface 671 may correspond to the interface 204 according to FIG. 2. The microcontroller 607 comprises a PWM signal generator 627. As an option, the microcontroller 607 may be arranged separate to the control logic 601.

The microcontroller 607 may provide driving commands (instructions) to the control logic 601 how to operate the LEDs 616 to 621. The driver circuit 606 may at least partially deployed on the common circuitry 203 (see FIG. 2) of the semiconductor device. The control logic 601 may be arranged to transform the driving commands of the microcontroller 607 into PWM switching signals $PWM_{610}$, $PWM_{611}$, $PWM_{612}$, $PWM_{613}$, $PWM_{614}$, $PWM_{615}$ for switching the LEDs 616 to 621 by means of the switching unit 663.

To avoid or reduce any ripple in the supply signal that is in particular caused by abruptly changing load conditions, the control logic 601 utilizes the sensing unit 602, which compares an actual sense signal $I_{sense}$ with a predetermined reference signal $I_{ref}$. Hence, it can be determined whether the sensed current $I_{sense}$ is outside the current range $\Delta I_{range}$.

The selecting unit 604 is triggered by output of the comparison unit 628. Upon triggering, the selecting unit 604 requests information about phase shifts to be applied to the PWM signal from the LUT 662. As an option, the LUT 662 may be a memory or a register that is accessed by the selecting unit 604; also, the LUT 662 can be realized as a portion of the selecting unit 604.

The LUT 662 may provide information for a (e.g., minimum) set of phase shifts that may be applied to the switching signals $PWM_{610}$, $PWM_{611}$, $PWM_{612}$, $PWM_{613}$, $PWM_{614}$, $PWM_{615}$. Based on this information, the selecting unit 604 determines phase shifts and conveys these via the select signal 664 to the delay array 605.

FIG. 9 shows an exemplary signal sequence of the input current $I_{IN}$ at the terminal 431 and the switching signals $PWM_{610}$, $PWM_{611}$, $PWM_{612}$, $PWM_{613}$, $PWM_{614}$, $PWM_{615}$ for controlling the current sources 610 to 615 which drive the LEDs 616 to 621. The switching signals $PWM_{610}$, $PWM_{611}$, $PWM_{612}$, $PWM_{613}$, $PWM_{614}$, $PWM_{615}$ may be pulse-width-modulated switching signals that are used for dimming the LEDs 616 to 621.

An abrupt change of the load condition may lead to a current ripple $\Delta I$ of the input current $I_N$. Based on the various ripples, a range of the supply signal can be determined via the sensing unit 661. In the example shown in FIG. 9, the range of the supply signal is a current range $\Delta I_{range}$.

In FIG. 9 different portions 901, 902 of the switching signals show a phase shift that is applied to the switching signals. It is noted that the phase shift can be applied differently to different portions 901, 902 of the switching signals.

The control logic 601 may apply an (e.g., adaptive) algorithm to provide phase shifts (in particular at least one phase shift) between at least two of the switching signals $PWM_{610}$, $PWM_{611}$, $PWM_{612}$ of the group 622 and the switching signals $PWM_{613}$, $PWM_{614}$, $PWM_{615}$ of the group 623 to reduce the load condition for the supply unit 401 and to reduce the ripple in the supply signal processed by the arrangement 603.

The sensing unit 602 senses the current at the terminal 431 at a time $t_{sense}$. The sensing unit 602 detects that the current sensed undershoots the current range $\Delta I_{range}$ by comparing the current sensed with a predetermined value (e.g., a reference current $I_{ref}$).

The undershoot of the current range $\Delta I_{range}$ may be caused by a command supplied by the microcontroller 607 that may require that all LEDs 616 to 621 need to be switched on simultaneously. Upon detection of the undershoot, the control logic 601 starts the algorithm with the objective to reduce future ripple in the supply signal.

With regard to portion 901 the switching unit 663 introduces a phase shift $\Delta t_1$ (also referred to as "delay") from a delay element of the delay array 605 to the rising edges of the switching signals $PWM_{610}$, $PWM_{611}$, $PWM_{612}$ of the group 622. The phase shift $\Delta t_1$ is applied after a time $t_1$ and it is selected by the selecting unit 604 based on information stored in the LUT 662. The phase shift $\Delta t_1$ reduces the load condition and hence the ripple in the supply signal at the time $t_1$.

With regard to portion 902 the switching unit 663 introduces a phase shift $\Delta t_2$ from the same of a different delay element of the delay array 605 to the rising edges of the switching signals $PWM_{613}$, $PWM_{614}$, $PWM_{615}$ of the group 623. The phase shift $\Delta t_2$ is applied after a time $t_2$ and it is selected by the selecting unit 604 based on information stored in the LUT 662. The phase shift $\Delta t_2$ reduces the load condition at and hence the ripple in the supply signal at the time $t_2$.

Thus, upon sensing the supply signal, a phase shift between the command of the microcontroller and the switching signals of the switching unit of a pixel cell and/or a group of pixel cells can be applied.

When the sensed value of the supply signal is outside the predetermined range, the information about an actual pixel cell status can be stored. At each PWM dimming period, the algorithm may evaluate at least one phase shift between groups of light sources in particular between pixel cells or combinations of pixel cells.

Utilizing phase shifts as described advantageously leads to a reduced amount of silicon area. It is also an advantage that the phase shifts allow for a smaller output capacitance of the supply unit.

The algorithm described may be used in combination with an internal charge-pump in order to reduce a boost capacitance and thus decrease the required silicon area.

The examples suggested herein may in particular be based on at least one of the following solutions. In particular combinations of the following features could be utilized in order to reach a desired result. The features of the method could be combined with any feature(s) of the device, apparatus or system or vice versa.

A device is provided for driving several light sources, wherein said device is arranged to:
  sense a supply signal; and
  apply a phase shift to a switching signal of at least one of the several light sources based on the sensed supply signal.

The supply signal may be a signal provided to the device or a portion of the device. A sensing unit can be used to sense the supply signal. For example, a power, a voltage or a current can be sensed and used for determining and applying the phase shift.

It is an option that several phase shifts are applied to several switching signals of several light sources. It is also an option that one phase shift is applied to several switching signals of several light sources.

Each light source may be an individual light source or a group of light sources. The light source may in particular be a semiconductor light source, e.g., an LED or an OLED. The light sources may be arranged in a matrix structure comprising at least two rows and two lines of light sources.

The switching signal is a signal used for controlling the light source. The switching signal may be delivered via a current source that is controlled by a control signal. The current source in this example may supply the current for operating the light source.

It is an advantage that the switching signals for light sources can be adjusted based on an actual supply signal sensed. Hence, a deterioration of the supply signal can be determined and the switching signals may subsequently adjust the load condition by controlling the switching signals for the light sources. In one example, a ripple in the supply signal (current or voltage) may be reduced, which leads to a more stable and easy to handle supply signal.

The device may be control logic or the device may comprise a control logic. The device may obtain a driving command for controlling the several light sources.

It is noted that the switching signal may be a pulse-width-modulated switching signal (PWM switching signal) that is used for dimming the light sources.

In an embodiment, the device is arranged to
  apply the phase shift if the sensed supply signal fulfills a predetermined condition.

In an embodiment, the predetermined condition is at least one of the following:
  the sensed supply signal reaches and/or exceeds a threshold; or
  the sensed supply signal is outside a predetermined range.

It is noted that the sensed supply signal may reach and/or exceed a threshold from above or from below; in this regard, the threshold can be an upper limit or a lower limit. The predetermined range may be defined by two thresholds, an upper limit and a lower limit.

In an embodiment, the phase shift is at least one of the following:
  a random phase shift;
  a pseudo-random phase shift; or
  a deterministic phase shift.

The phase shift may be determined in various ways. For example, a random phase shift may be introduced to arbitrarily offset (a portion of) the switching signals from each other. Due to the phase shift, the light sources or at least a portion thereof are not switched on or off at the same time. The arbitrary offset might be a result based on a (true) randomness, a pseudo-randomness or even a deterministic distribution of phase shifts. The pseudo-randomness may be a randomness generated by a deterministic machine, e.g., a processor or controller. The deterministic phase shift may be based on a deterministic distribution, which has no randomness, but also provides a pattern of different phase shifts. Such deterministic distribution may be supplied by a memory, in which an order of numbers is stored, which may look arbitrary or which may be predetermined to introduce an arbitrary-alike distribution. For example, a sequence of number 3, 6, 1, 2, 5, 8 may be used as a basis to be multiplied with a predetermined time basis, e.g., 10 ms, and therefore result in different phase shifts. Hence, the first phase shift is 30 ms, the second 60 ms, etc. If the last value of this sequence (i.e. 80 ms) is reached, the next value could be the first value of the sequence leading (again) to the phase shift of 30 ms.

In an embodiment, the phase shift is applied to a falling edge of the switching signal and/or a rising edge of the switching signal.

In an embodiment, the device comprises a sensing unit to determine the sensed supply signal.

The sensing unit may comprise measuring means and/or detection means, e.g., a shunt element or an inductive coupling. The sensing unit may detect whether the predetermined condition is fulfilled.

In an embodiment, each light source may comprise several light source elements.

Hence, the phase shift can be applied to a group of light source elements. Each light source element can be a semiconductor light element, e.g., an LED or an OLED. It is also an option that a first phase shift is applied to a first group of light source elements and a second phase shift is applied to a second group of light source elements. This applies accordingly for more than two groups of light source elements and more than two phase shifts.

It is an option that the grouping of light source elements may be static or it may be variable. It may in particular be changed depending on a control cycle, e.g., a PWM period or a predetermined time period.

In an embodiment, the device is further arranged to:
apply several phase shifts to several switching signals of the several light sources based on the sensed supply signal.

In an embodiment, the device is further arranged to:
apply the phase shift to the switching signal of at least one of the several light sources based on the sensed supply signal via an algorithm.

For example, the phase shifts may be adjusted based on an algorithm, which may be an adaptive algorithm. This may affect the length of the phase shifts (i.e. the delay introduced) to rising and/or falling edges of the switching signals. The adaptive algorithm may operate in an iterative way to stepwise reduce the deterioration, e.g., ripple, caused by the switching signals. The sensed supply signal indicated the deterioration. The algorithm may use at least one phase shift and apply it to the switching signals. A next sensing step reveals whether the deterioration is within a predefined limit, e.g., range. If not, the algorithm may further apply different phase shifts. If the deterioration is within the predefined limit, the same phase shifts may be maintained or a reduced amount of phase shifts may be tried.

Thus, the algorithm reduces the deterioration applied to the supply signal by the switching signals. Adjusting the switching signals reflects on the load situation which in turn may reduce the deterioration of the supply signal.

The algorithm may terminate (reach a, e.g., temporary, final state) if the predetermined condition is fulfilled.

In an embodiment, the supply signal is obtained from a supply unit. In some examples, the device may be arranged to receive the supply signal from the supply unit.

The supply unit may be a unit separate from the device described herein. It is also an option that the supply unit is part of the device. Also, the supply unit may comprise at least one charge pump.

In an embodiment, the phase shift is obtained from a memory, in particular from a lookup-table. In some examples, the device may be arranged to receive the phase shift from the look-up table of the memory.

In an embodiment, the several light sources are arranged in a matrix structure, said matrix structure comprising at least two rows and at least two columns of light sources.

In an embodiment, each light source comprises at least one semiconductor light source, in particular at least one LED or at least one OLED.

In an embodiment, the device is an integrated circuit, in particular realized as a single chip.

Also, a lighting device is provided comprising
a matrix structure of light sources comprising at least two rows and at least two columns of the light sources; and
a semiconductor device comprising:
a light source driver matrix on top of which the matrix structure of the light sources is arranged, and
a common area, wherein the light source driver matrix is arranged for driving the light sources, wherein the light source driver matrix is arranged to:
sense a supply signal; and
apply a phase shift to a switching signal of at least one of the several light sources based on the sensed supply signal.

In an embodiment, the common area comprises a common circuitry, which is arranged adjacent to the light source driver matrix, wherein the common circuitry is arranged for operating the light source driver matrix and/or supplying the light source driver matrix.

It is noted that the features described with regard to a particular device may also apply for the method accordingly.

A method is provided for driving several light sources, wherein the method comprises:
sensing a supply signal; and
applying a phase shift to a switching signal of at least one of the several light sources based on the sensed supply signal.

In an embodiment, the steps of sensing the supply signal and applying the phase shift to the switching signal are iterated until a predetermined condition is fulfilled and/or a termination condition is fulfilled. Thus, sensing the supply signal may comprise sensing the supply signal until a predetermined condition is fulfilled or a termination condition is fulfilled, and applying the phase shift to the switching signal comprises applying the phase shift to switching signal until a predetermined condition is fulfilled or a termination condition is fulfilled.

The algorithm may terminate (reach a, e.g., temporary, final state) if the predetermined condition is fulfilled. The termination condition may be a predetermined number of iterations or a predetermined combinations of phase shifts applied.

In an embodiment, the predetermined condition is at least one of the following:
the sensed supply signal reaches and/or exceeds a threshold;
the sensed supply signal is outside a predetermined range.

In an embodiment, the method further comprises:
applying several phase shifts to several switching signals of the several light sources based on the sensed supply signal.

Also, a computer program product is suggested, which is directly loadable into a memory of a digital processing device, comprising software code portions for performing the steps of the method as described herein.

Further, a computer-readable medium is provided having computer-executable instructions adapted to cause a computer system to perform the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1)

tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for driving several light sources, wherein the device comprises:
    a switching unit configured to deliver a switching signal to drive at least one light source of the several light sources based on energy delivered by a supply signal received from a supply unit; and
    a sensing unit configured to sense the supply signal,
    wherein the switching unit includes a time delay element configured to apply a phase shift to the switching signal of the at least one light source of the several light sources based on the sensed supply signal.

2. The device of claim 1, wherein the time delay element is configured to apply the phase shift to the switching signal if the sensed supply signal fulfills a predetermined condition.

3. The device of claim 2, wherein the predetermined condition comprises at least one of the following conditions:
    the sensed supply signal reaches or exceeds a threshold; or
    the sensed supply signal is outside of a predetermined range defined by an upper limit and a lower limit, wherein the threshold is equal to the upper limit or the lower limit.

4. The device of claim 1, wherein the phase shift comprises at least one of the following:
    a random phase shift;
    a pseudo-random phase shift; or
    a deterministic phase shift.

5. The device of claim 1, wherein the time delay element is configured to apply the phase shift by at least applying the phase shift to a falling edge of the switching signal or a rising edge of the switching signal.

6. The device of claim 1,
    wherein the sensing unit is further configured to determine whether the sensed supply signal is outside a predetermined range defined by an upper limit and a lower limit, and
    wherein the time delay element is configured to apply the phase shift to the switching signal based on the sensing unit determining that the sensed supply signal is outside the predetermined range.

7. The device of claim 1, wherein the at least one light source comprises several light source elements.

8. The device of claim 1, wherein the switching unit includes several time delay elements configured to apply several phase shifts to several switching signals of the several light sources based on the sensed supply signal.

9. The device of claim 1, wherein the time delay element is configured to apply the phase shift to the switching signal of the at least one light source of the several light sources based on the sensed supply signal via an algorithm.

10. The device of claim 1, wherein the sensing unit is further configured to receive the supply signal from the supply unit.

11. The device of claim 1, wherein the switching unit is further configured to receive the phase shift from a look-up table of a memory.

12. The device of claim 1, wherein the several light sources are arranged in a matrix structure, the matrix structure comprising at least two rows and at least two columns of light sources.

13. The device of claim 1, wherein each light source of the several light sources comprises at least one semiconductor light source, in particular at least one LED or at least one OLED.

14. The device of claim 1, wherein the device comprises an integrated circuit, in particular realized as a single chip, wherein the single chip includes the switching unit and the sensing unit.

15. A lighting device comprising:
a matrix structure of light sources comprising at least two rows and at least two columns of the light sources; and
a semiconductor device comprising:
 a light source driver matrix on top of which the matrix structure of the light sources is arranged, and
 a common area,
wherein the light source driver matrix is configured to drive the light sources,
wherein the light source driver matrix comprises:
 a switching unit configured to deliver a switching signal to drive at least one light source of the light sources based on energy delivered by a supply signal received from a supply unit; and
 a sensing unit configured to sense the supply signal,
 wherein the switching unit includes a time delay element configured to apply a phase shift to the switching signal of the at least one light source of the light sources based on the sensed supply signal.

16. The lighting device of claim 15, wherein the common area comprises a common circuitry, which is arranged adjacent to the light source driver matrix, wherein the common circuitry is configured to operate the light source driver matrix or supply the light source driver matrix.

17. A method for driving several light sources, the method comprising:
delivering a switching signal to drive at least one light source of the several light sources based on energy delivered by a supply signal received from a supply unit;
sensing the supply signal; and
applying a phase shift to the switching signal of the at least one light source of the several light sources based on the sensed supply signal.

18. The method of claim 17, further comprising iterating steps of sensing the supply signal and applying the phase shift to the switching signal until a predetermined condition is fulfilled or a termination condition is fulfilled.

19. The method of claim 18, further comprising determining that the supply signal is outside a predetermined range defined by an upper limit and a lower limit,
wherein applying the phase shift comprises applying the phase shift to the switching signal in response to determining that the sensed supply signal is outside the predetermined range.

20. The method of claim 17, further comprising applying several phase shifts to several switching signals of the several light sources based on the sensed supply signal.

21. A computer program product directly loadable into a memory of a digital processing device, comprising software code portions for performing the steps of the method according to claim 17.

22. A computer-readable medium having computer-executable instructions adapted to cause a computer system to perform the steps of the method according to claim 17.

23. A device for driving several light sources, the device comprising:
means for delivering a switching signal to drive at least one light source of the several light sources based on energy delivered by a supply signal received from a supply unit;
means for sensing the supply signal; and
means for applying a phase shift to the switching signal of the at least one light source of the several light sources based on the sensed supply signal.

* * * * *